United States Patent [19]

Masclet et al.

[11] 4,088,286

[45] May 9, 1978

[54] SHOCK ABSORBER

[75] Inventors: Jean Masclet, Paris; Jacques Veaux, Chatillon-sur-Bagneux, both of France

[73] Assignee: Messier-Hispano, S.A., Montrouge, France

[21] Appl. No.: 765,284

[22] Filed: Feb. 3, 1977

[30] Foreign Application Priority Data

Feb. 4, 1976 France ............................ 76 03126
Nov. 4, 1976 France ............................ 76 33261

[51] Int. Cl.$^2$ ...................... B64C 25/22; B64C 25/60
[52] U.S. Cl. ...................... 244/102 SL; 244/104 FP; 267/64 R
[58] Field of Search ............ 244/102, 104 R, 104 FP; 188/300, 322, 269; 92/26; 91/420; 267/64 R, 64 A, 64 B, 65

[56] References Cited

U.S. PATENT DOCUMENTS

| 2,294,918 | 9/1942 | Levy | 244/102 SS |
|---|---|---|---|
| 2,554,581 | 5/1951 | Levy | 244/102 R |
| 2,698,751 | 1/1955 | Nye et al. | 244/104 FP |
| 2,892,626 | 6/1959 | Scott et al. | 244/104 R |
| 2,942,809 | 6/1960 | Roy | 244/104 R |
| 3,140,084 | 7/1964 | Schmidt | 267/64 R |
| 3,156,257 | 11/1964 | Strader | 91/420 |
| 3,290,038 | 12/1966 | Tollar | 244/104 R |
| 3,292,919 | 12/1966 | Lindley et al. | 267/64 B |
| 3,322,393 | 5/1967 | Neilson et al. | 244/104 R |
| 3,426,651 | 2/1969 | Arendarski | 244/104 R |

FOREIGN PATENT DOCUMENTS

| 803,805 | 3/1937 | France | 244/104 R |
|---|---|---|---|
| 1,013,821 | 12/1965 | United Kingdom | 244/104 R |

*Primary Examiner*—Galen L. Barefoot
*Attorney, Agent, or Firm*—Scully, Scott, Murphy & Presser

[57] ABSTRACT

A shock-absorber of the piston-and-cylinder kind for use in the landing gear of an aircraft and comprising a cylinder, a piston-rod and a shock-absorbing rod which encloses a chamber for compressed gas and is provided with a valve having a throttling orifice, in which the shock-absorbing rod is mounted to slide, in a fluid-tight manner, in a first chamber, filled with hydraulic fluid, of the cylinder or of the piston-rod, to form a oleopneumatic shock-absorber; the piston-rod is mounted to slide, in a fluid-tight manner, in the cylinder and is solidly connected to a piston-head which, with the cylinder, defines a descent chamber to control lowering of the landing gear when hydraulic fluid is admitted to the descent chamber; the shock-absorber also comprises a lifting piston to load the shock-absorber and mounted to slide within a second chamber of the cylinder or of the piston-rod, so defining a lifting chamber to control lifting of the landing gear when hydraulic fluid is admitted to the lifting chamber through a hydraulic locking valve having a pressure-controlled opening, and a locking device for locking the piston-rod in relation to the cylinder, in the "landing gear down" position, the locking device being releasable either by the application of the lifting pressure to the landing gear, which simultaneously pressurizes the lifting chamber, by displacement of the lifting piston which loads the shock-absorber, and voids the descent chamber by displacement of the piston-rod in the cylinder, or by the application of a simple pressure for releasing the locking device, thus permitting the piston-rod to be displaced in the cylinder under the action of the weight of the aircraft which thus moves the landing gear into a dropped position when the descent chamber is voided, the movement from the dropped position or the "landing gear retracted" position being effectable solely by applying a descent pressure simultaneously in the descent chamber and at said locking valve, so as to open the locking valve.

18 Claims, 7 Drawing Figures

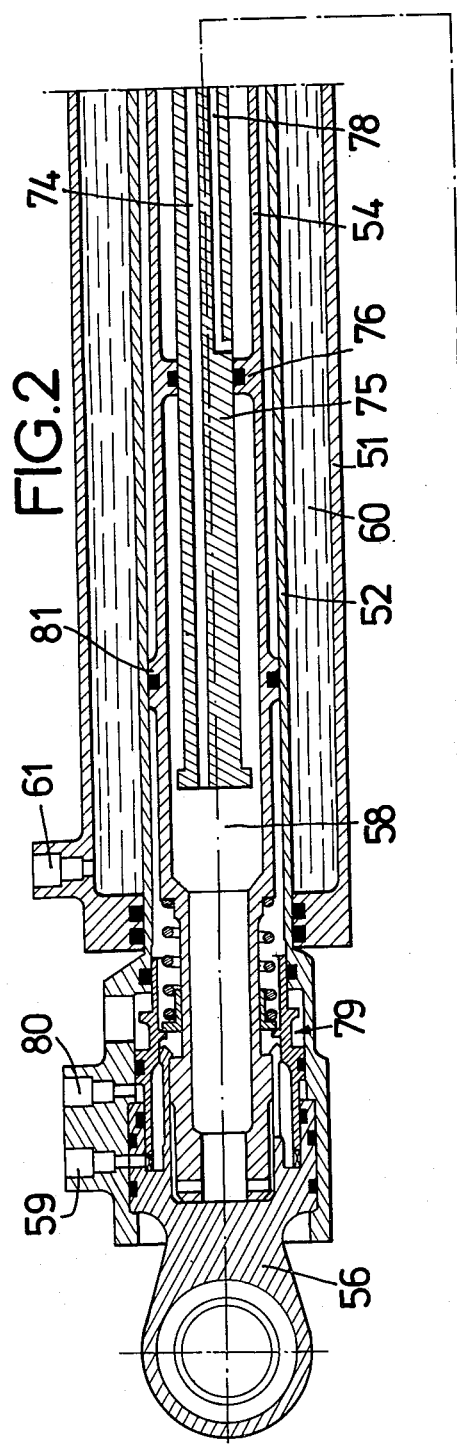
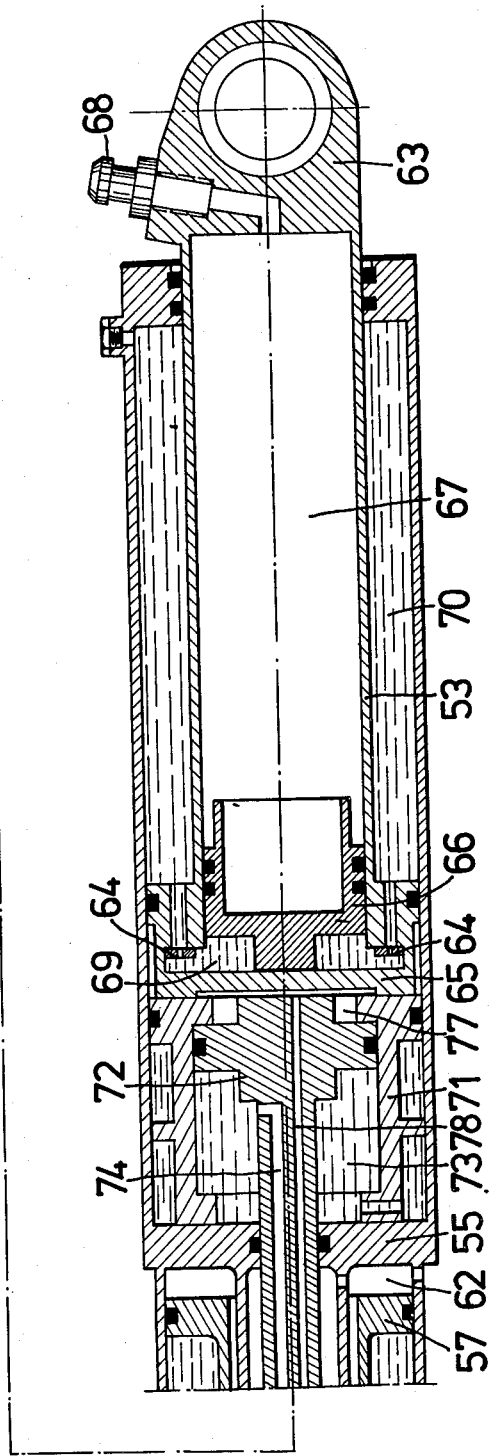
FIG.2

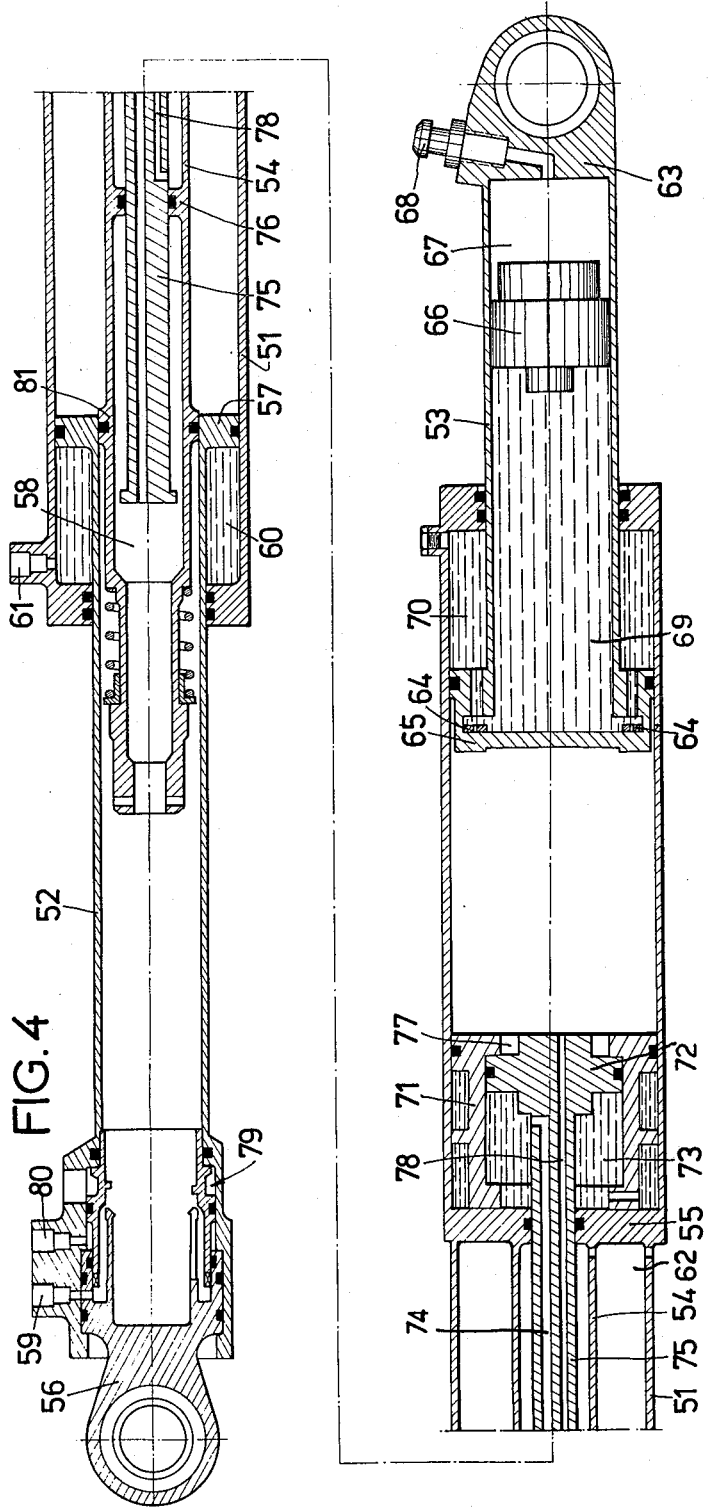

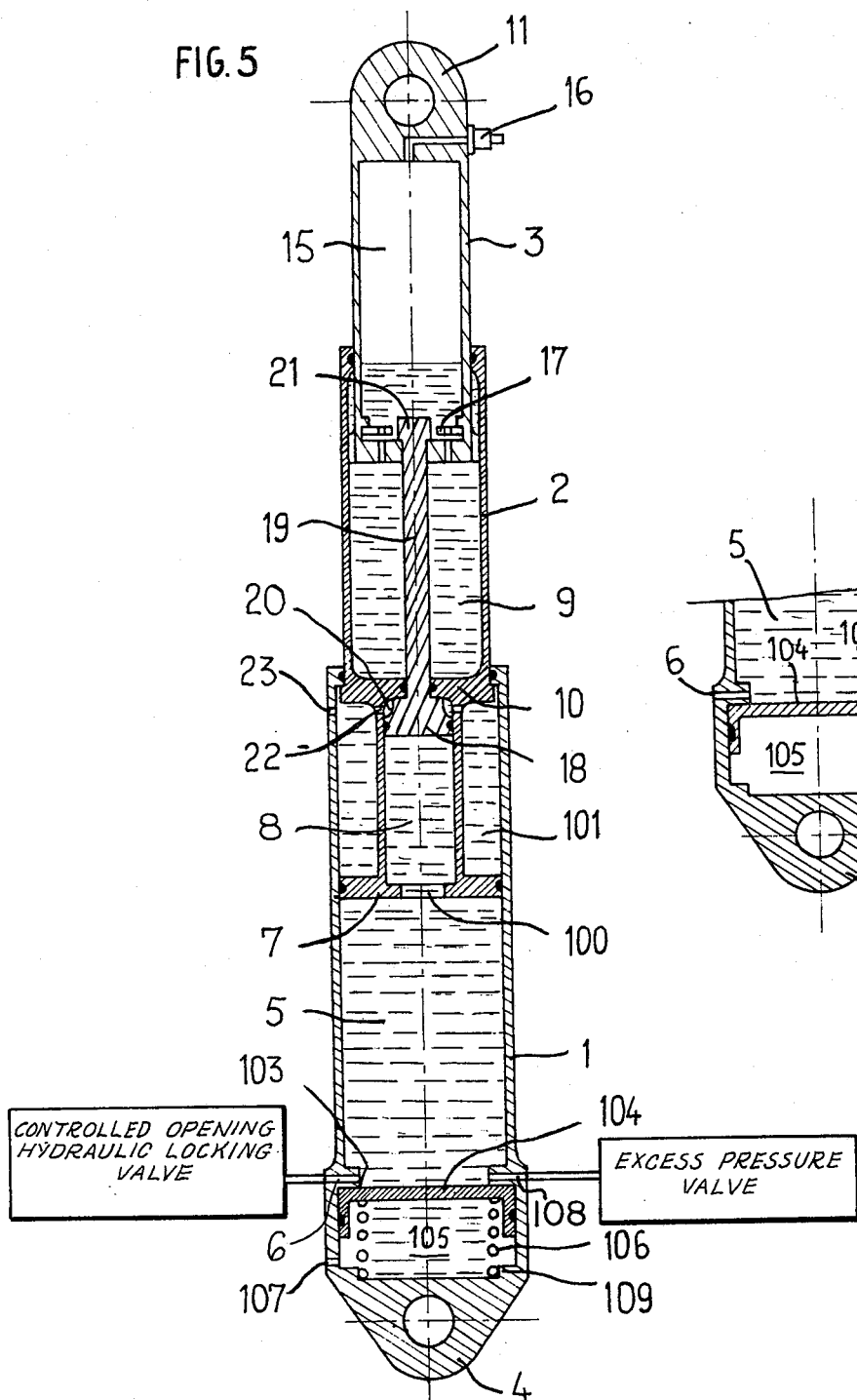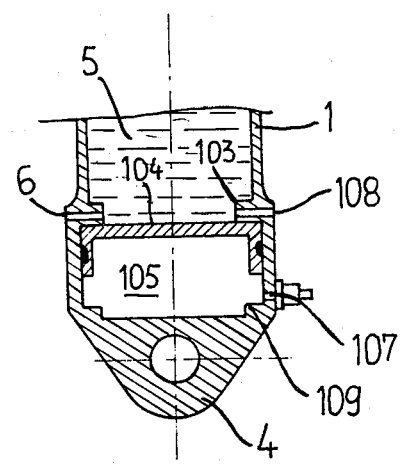

SHOCK ABSORBER

BACKGROUND OF THE INVENTION

The invention relates to a shock-absorber of the piston-and-cylinder kind for use in the landing gear of aircraft.

The invention has particular but not exclusive application to light aeroplanes or helicopters, and is most suitable for equipping landing gear of the "pendulum" type. The shock-absorber can be arranged in a substantially vertical position in which case it functions by being compressed under the load, or can be arranged in a substantially horizontal position in which case it functions by being relaxed under the load.

Shock-absorbers have been previously proposed which have the dual function of firstly serving as a shock-absorber when the aircraft is landing and/or taxiing and supporting the static weight of the aircraft when the aircraft is stationary on the ground, and secondly the function of raising and/or lowering the landing gear when the aircraft is in flight.

The invention has among its objects to provide a shock-absorber of the piston-and-cylinder kind which, in addition to the two above-mentioned functions, is also able to carry out the functions known as "dropping" the aircraft and returning the aircraft to the normal position from the dropped position, with its landing gear down, by means of a hydraulic actuating system. Dropping is the operation of lowering the aircraft, while it is supported on its wheels, beyond its normal position so as to facilitate certain manoeuvres or to improve certain characteristics of the aircraft. For example, dropping enables a helicopter to be more readily loaded into and moved within the cargo compartment of an air-freighter. It also enables the stability of a helicopter to be increased when it is resting on the deck of an aircraft-carrier or other vessel, and even on a platform floating on the surface of the sea. Finally, for the purpose of placing a helicopter on the ground in a configuration that reduces the dangerous effects of resonance waves striking the ground, it has been found very advantageous to equip the helicopter with a landing gear which enables dropping to be effected.

SUMMARY OF THE INVENTION

In accordance with the present invention there is provided a shock-absorber of the piston-and-cylinder kind for use in the landing gear of an aircraft and comprising a cylinder, a piston-rod and a shock-absorbing rod which encloses a chamber for compressed gas and is provided with a valve having a throttling orifice, in which the shock-absorbing rod is mounted to slide, in a fluid-tight manner, in a first chamber, filled with hydraulic fluid, of the cylinder or of the piston-rod, to form a oleo-pneumatic shock-absorber; the piston-rod is mounted to slide, in a fluid-tight manner, in the cylinder and is solidly connected to a piston-head which, with the cylinder, defines a descent chamber to control lowering of the landing gear when hydraulic fluid is admitted to the descent chamber; the shock-absorber also comprises a lifting piston to load the shock-absorber and mounted to slide within a second chamber of the cylinder or of the piston-rod, so defining a lifting chamber to control lifting of the landing gear when hydraulic fluid is admitted to the lifting chamber through a hydraulic locking valve having a pressure-controlled opening, and a locking device for locking the piston-rod in relation to the cylinder, in the "landing gear down" position, the locking device being releasable either by the application of the lifting pressure to the landing gear, which simultaneously pressurizes the lifting chamber, by displacement of the lifting piston which loads the shock-absorber and voids the descent chamber by displacement of the piston-rod in the cylinder, or by the application of a simple pressure for releasing the locking device, thus permitting the piston-rod to be displaced in the cylinder under the action of the weight of the aircraft which thus moves the landing gear into a dropped position when the descent chamber is voided, the movement from the dropped position or the "landing gear retracted" position to the "landing gear down" position being effectable solely by applying a descent pressure simultaneously in the descent chamber and at said locking valve, so as to open the locking valve.

The locking device, in the "landing gear down" position of the piston-rod in relation to the cylinder, may either be mechanical, of the kind including claws adapted to engage behind a projection and, optionally, a slider by which the claws can be locked, or it may be purely hydraulic, of the kind comprising a hydraulic controlled-opening locking valve of any suitable known kind which pressurizes and then isolates the descent chamber of the shock-absorber. In this latter case, an excess-pressure shock-absorber valve, acting as an "anti-crash" valve, can be arranged in parallel with this hydraulic controlled opening locking valve or in an additional opening discharging into the descent chamber, such excess-pressure valve opening in the event of a crash landing so that the piston is able to expel, over its entire stroke, the hydraulic fluid contained in the descent chamber. The shock-absorber then functions as an extended-stroke shock-absorber in the case of a crash landing, by absorbing a large amount of energy on impact because of its piston and cylinder.

The efficiency of the means provided can be improved for absorbing expansion of the hydraulic fluid, and shock-absorbing performance can also be improved.

For this purpose, the shock-absorber comprises a storage chamber adjacent the descent chamber from which it is separated by at least one separator piston, biased by spring means against a first stop so as to limit the volume of the descent chamber, and can be displaced against spring means under the effect of thermal expansion of the hydraulic fluid in the descent chamber, so that said additional chamber forms a chamber for storing the extra volume of hydraulic fluid resulting from its thermal expansion.

Advantageously, that portion of the second chamber not occupied by the lifting chamber communicates with the descent chamber so that the storage chamber also acts as a storage chamber for storing the extra volume of hydraulic fluid from the lifting chamber that is created by thermal expansion of this fluid.

The invention is diagrammatically illustrated by way of example in the form of a shock-absorber for a pendulum-type helicopter landing gear and with reference to the accompanying drawings.

BRIEF DESCRIPTION OF THE DRAWINGS

In the drawings:

FIGS. 2, 3 and 4 illustrate, in longitudinal section, another embodiment of a shock-absorber of the piston and cylinder kind according to the invention which extends when under load, the shock-absorber being illustrated in the respective positions it occupies when the landing gear is down and the shock-absorber relieved of load; when the landing gear is retracted and the shock-absorber is subjected to a balancing load approximating to the static load; and finally, when the landing gear is dropped and the shock-absorber carries the static load; and FIGS. 5, 6 and 7 illustrate, in longitudinal section, three further embodiments of shock-absorber of the piston and cylinder kind according to the invention in the position occupied when the landing gear is down and the shock-absorber relieved of load.

DESCRIPTION OF THE PREFERRED EMBODIMENTS

Figure 1:
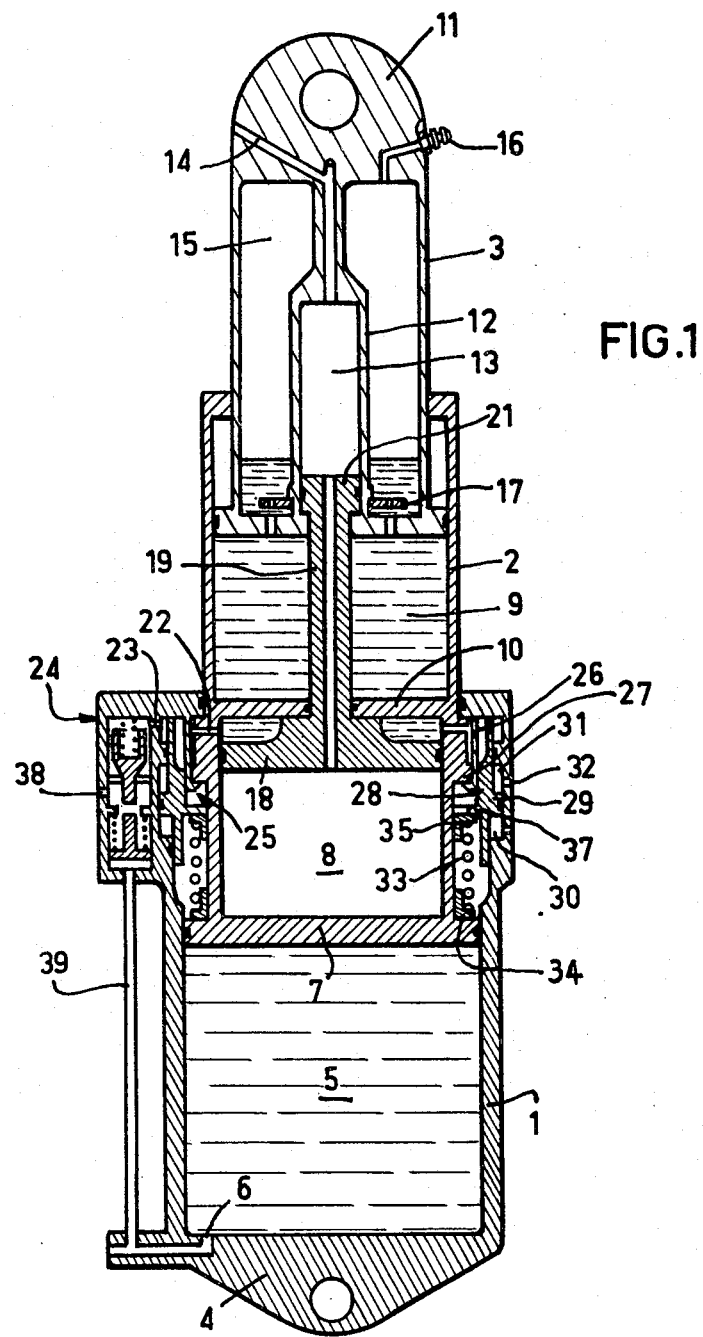
FIG. 1 illustrates, in longitudinal section a shock-absorber of the piston and cylinder kind according to the invention which is in compression when under load, the shock-absorber being shown in the position it occupies when the landing gear is down and the shock-absorber is relieved of load.

Referring to FIG. 1, a shock-absorber comprises a cylinder 1, a piston-rod 2 which can slide in a fluid-tight manner in the cylinder 1, and a shock-absorber rod 3. The cylinder 1 has, at its lower end, a fitting 4 for securing the shock-absorber to a member carrying the wheel or wheels of the landing gear, and defines a chamber 5, referred to as the descent chamber of the landing gear, which chamber can be supplied with hydraulic fluid from a source of hydraulic fluid (not illustrated) by way of a supply orifice 6. The piston-rod 2 has at its lower end a piston-head 7 which slides in a fluid-tight manner in the cylinder 1 and which defines two interior chambers 8 and 9, the shock-absorber rod 3 being slidable in the chamber 9 in a fluid-tight manner.

The shock-absorber rod 3, is provided with a fitting 11 for securing it to the structure of the landing gear or, optionally, to the aircraft structure, comprises a cylindrical inner wall 12 defining an inner chamber 13 which communicates with the atmosphere through a duct 14, and a peripheral chamber 15 containing compressed gas, for example air or nitrogen, which is admitted through a charging and inflating valve 16. Arranged at the lower end of the peripheral chamber 15 is at least one valve 17 having one or more throttling orifices. The chamber 9 and the lower portion of the peripheral chamber 15 contain a hydraulic fluid in which the valve 17 is immersed. The assembly formed by the shock-absorber rod 3 and that portion of the piston-rod 2 that surrounds the chamber 9, forms an oleopneumatic shock-absorber of the simplest kind which has no separator piston and wherein the hydraulic fluid, either compressed or relaxed, is throttled between the chamber 9 and the chamber 15. This simple shock-absorber could be replaced by more complex means comprising, for example, one or two air chambers, one or even two separator pistons, valves having throttling orifices variable in dependence upon the speed of penetration or the direction of movement of the fluid, braking means for when relaxation is completed, and resilient means consisting of a stop-short spring, these various means being used either separately or in various combinations.

A piston 18 for lifting the landing gear or retracting the shock-absorber is mounted to slide in a fluid-tight manner within the chamber 8 and is solidly connected to a sleeve 19 which extends, in a fluid-tight manner, through a wall 10 of the piston-rod 2 separating the chamber 9 from the chamber 8. The sleeve 19 has an enlarged upper end 21 which can slide in a fluid-tight manner within the chamber 13 and which also acts as a stop. That portion of the chamber 8 between the piston-head 7 and the underside of the piston 18 for retracting the shock-absorber, is connected to the inner chamber 13 through the central passage of the sleeve 19 and therefore is vented to the atmosphere. However that portion of the chamber 8 that is located above the lifting piston 18 forms a chamber for lifting the landing gear and can be supplied with hydraulic fluid from a source of hydraulic fluid (not illustrated) by way of a duct 22 formed in the piston-rod 2, a duct 23 formed in the cylinder 1 and a variable-opening hydraulic locking valve 24 of known kind and not forming any part of the subject-matter of this invention.

Finally, a locking system comprising claws 25 is disposed in the annular space delimited by the cylinder 1, the piston-rod 2 and the piston head 7. This locking system may be of a conventional kind comprising resilient claws integral with the piston rod 2 and to engage in a groove formed in the cylinder 1, but it is preferably formed by resilient claws 26, integral with the cylinder 1, which engage to the rear of a projection 27 formed on the piston-rod 2 and also constituting a stop which prevents the rod 2 from sliding out of the cylinder 1 when the landing gear descends. Furthermore, this locking system comprises an annular cap 28, which under the action of a control pressure, can slide from a first position, in which it locks the claws, to a second position, in which it releases the claws. The annular cap 28 comprises at least three portions having different outside diameters, a portion 29, having the greatest diameter, forming a stop which limits displacement of the cap 28 which, with the cylinder 1, defines two annular spaces, of which one 30 is vented to atmosphere and the other, 31, can be supplied with hydraulic fluid through an orifice 32. A spring 33, one end of which bears against a ring 34 which it presses against the piston head 7, while the other is supported by a ring 35 and holds the cap 28 in the locking position by pressing the ring 35 against a shoulder 37 formed on the capt 28, when no hydraulic fluid is being admitted through the orifice 23 and the orifice 32.

The shock-absorber, of which the construction has just been described, operates in the following manner; starting at the "landing gear down" position as illustrated in FIG. 1 and after having applied a static load to the shock-absorber, all that is required for the purpose of moving into the dropped position of the aircraft, is to admit compressed hydraulic fluid by way of the orifice 32. Because of the action of the differential piston resulting from the different outside diameters of the various portions of the cap 28, pressurizing of the annular space 31 causes the cap 28 to slide downwardly against the action of the spring 33, and this has the effect of releasing the claws 26. This hydraulic release action then permits the piston-rod 2 to slide in the cylinder 1 under the action of the weight of the aircraft, until the piston 7 moves into abutment with the end wall bearing the fitting 4 at the base of the cylinder 1.

Starting from this dropped position and after take-off, to obtain the "landing gear retracted" position, all that is requires is to admit pressurized hydraulic fluid through an orifice 38 of the valve 24 and thus through the orifices 23 and 22, into the portion of the chamber 8 positioned above the piston 18, this causing the lifting piston 18 of the shock-absorber to slide in the chamber 8, the upper stop 21 on the sleeve 19 causing the shock-absorber rod 3 to be retracted in the chamber 9.

If it is required to reach the "landing gear retracted" position directly from the "landing gear down" position, it is likewise only necessary to admit hydraulic fluid through the orifice 38 of the valve 24 and thus through the orifices 23 and 22, this simultaneously causing sliding of the lifting piston 18, as previously explained, and hydraulic release of the cap 28 under the action of the differential piston, as a result of the different outside diameters of the portions of the cap 28, this movement occurring against the action of the spring 33. The hydraulic release can thus be effected by either of two control pressures, that is to say the pressure for lifting the landing gear that is applied through the orifice 38, and the pressure for obtaining the dropped position, that is applied through the orifice 32.

To move from the "landing gear retracted" position or the dropped position to the "landing gear down" position, it is only necessary to admit pressurized hydraulic fluid to the descent chamber 5 by way of the supply orifice 6, and this, by acting on the piston head 7, causes the piston-rod 2 to slide until it becomes locked onto the claws 26, the spring 33 returning the cap 28 to the locking position.

The return of the piston 18 for lifting the shock-absorber is caused by the relaxation of the shock-absorber when the hydraulic fluid returns to the exterior circuit through the orifices 22 and 23 and the valve 24 (which is opened under the action of the descent or lifting pressure applied through a duct 39). Thus there is a specific supply orifice, i.e. the orifice 6, the orifice 38 and the orifice 32 respectively corresponding to each of the three positions; "landing gear down", "landing gear retracted" and "landing gear dropped".

When the shock-absorber is loaded, for example, when the aircraft is taxiing, the shock-absorber rod 3 oscillates in the chamber 9. The advantage provided by the sleeve 19, which is solidly connected to the piston 18 for retracting the shock-absorber and has its upper enlarged end 21 slidable in the chamber 13, is that these oscillations are not transmitted to the piston 18, and this prevents any cavitation phenomenon in the lifting chamber and thus avoids any hydraulic pumping action which could have a damaging effect on the condition of the hydraulic circuit (not illustrated) of the aircraft. Furthermore, this assembly enables the number of moving joints, required for enabling the shock-absorber to function, to be limited.

It is also possible in this equipment to select an effective cross-section of the lifting piston 18 that is substantially equal to that of the shock-absorber, and this permits the shock-absorber to be retracted hydraulically by the application of a balanced force thereto. Such selection of the effective cross-section of the lifting piston 18, in fact provides, in the "landing gear retracted" position, a point of balance located in the rapidly variable sloping zone of the "air curve" of the shock-absorber, so as to achieve high precision in the retraction value, and said choice also enables a pressure to be obtained in the shock-absorber in the "landing gear retracted" position that is substantially equal to the pressure in the shock-absorber under static load. Consequently the positions of the wheel-centres in the "landing gear retracted" and the "landing gear dropped" positions approximate to each other.

Finally, since hydraulic locking in the "landing gear retracted" position is achieved without trapping part of the hydraulic fluid in that portion of the chamber 8 located below the piston 18, expansion of the hydraulic fluid in the circuit that results from large variations in temperature, to which the aircraft may be subjected during its movements, acts against the shock-absorber which performs the function of an expansion-storage means and prevents stresses of any great magnitude from affecting the mechanical elements of the equipment.

In the "landing gear down" position, it is also possible to provide a purely hydraulic locking system by fitting a valve of any suitable known kind at the orifice 6, which valve maintains the descent chamber 5 under pressure. An excess-pressure valve, as conventionally used in shock-absorbers, can be fitted in parallel with this pressure-holding valve, at the orifice 6 or at a second orifice leading into the chamber 5.

In this way, in the case of a crash landing and for the purpose of effecting a purely hydraulic locking action in the "landing gear down" position, the excess-pressure valve opens, and the piston-rod 7, over its entire stroke, expels hydraulic fluid from the cylinder 1. The shock-absorber thus functions as an extended-stroke shock-absorber in the case of crash landings, by absorbing a great amount of energy on impact, because of its piston-and-cylinder design.

If the means for locking the equipment in the "landing gear down" position are mechanical, and comprise, for example, claws as described above, the same possibilities can be created by providing a "mechanical fuse" which, upon rupturing when a force of a certain magnitude is applied to it, releases the rod 2 and the piston-head 7 in the cylinder 1. This fuse can be constituted by a repturable portion provided on the claws 26. Naturally, hydraulic and mechanical means can be used simultaneously for locking the landing gear in the "down" position. The "hydraulic fuse" formed by the excess-pressure valve, and the "mechanical fuse" can be rated to "blow" simultaneously or in a predetermined order.

Furthermore, it will be understood that a separator piston is suitably fitted in the chamber 15 for the purpose of separating the pressurized gas from the hydraulic fluid, it is possible to reverse the shock-absorber when in use by connecting the fitting 11 to the element carrying the wheel or wheels, and by connecting the fitting 4 to the structure of the landing gear or to the aircraft structure.

In the case where at least two landing gears of the aircraft are equipped with such shock-absorbers, a hydraulic operating means which selects only one or less than all of them, enables the aircrafts to be dropped asymmetrically.

Figure 3:
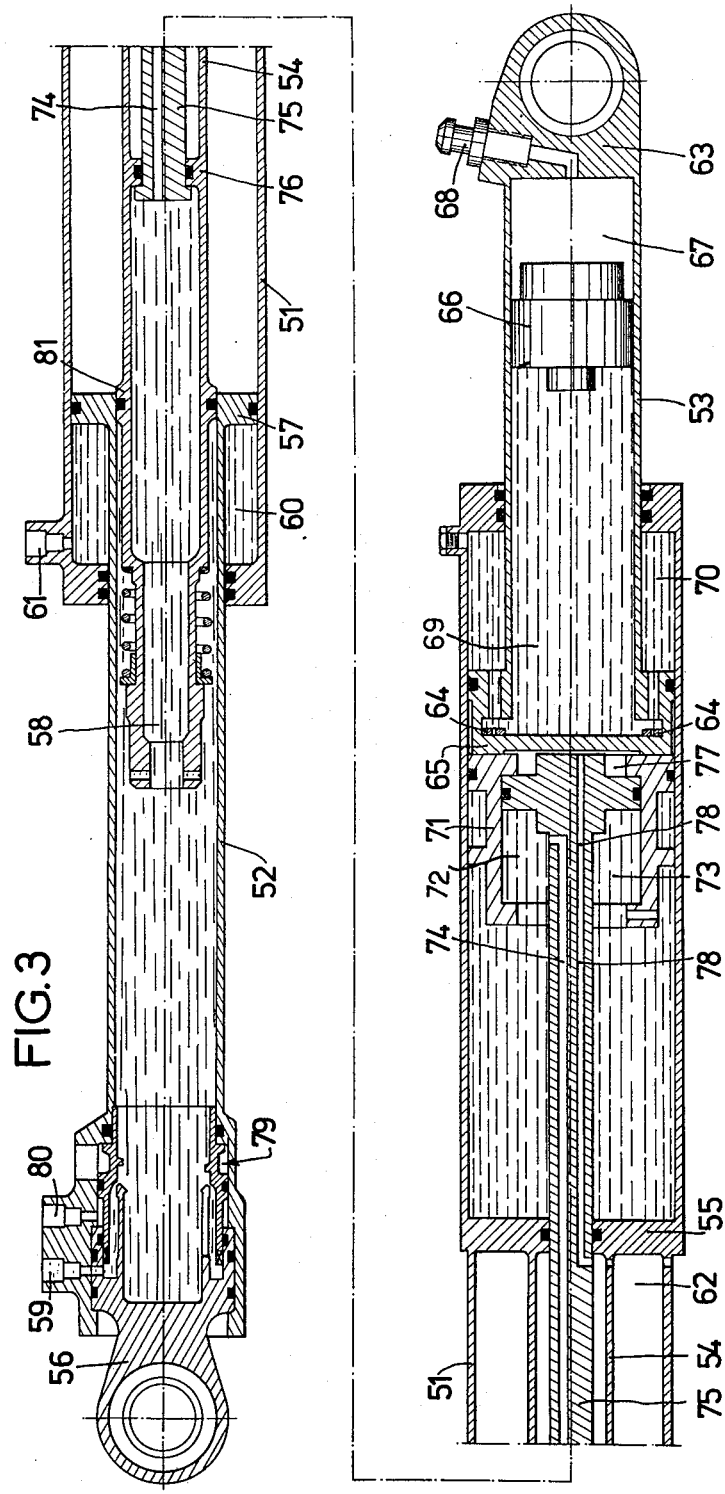

Referring to FIGS. 2, 3 and 4, there now follows a description of a shock-absorber which functions when subjected to tensile force and which is designed to be fitted substantially horizontal between, for example, a fixing point on the aircraft structure and one arm of a two-arm lever, the other arm of which may be a pendulum arm carrying the wheels, so that the shock-absorber is at its minimum length when the landing gear is down and the shock-absorber is relieved of load, is of maximum length when the landing gear is retracted, the shock-absorber supporting a load substantially equal to the static load, is of a length less than or substantially equal to the maximum when the aircraft is in the "dropped" position, and finally is at medium length when the aircraft is on the ground, the landing gear of course being down and the shock-absorber being under static load, The shock-absorber of the piston-and-cylinder type shown in FIGS. 2, 3 and 4 comprises a two-part cylinder 51, one part of which acts as the cylinder for accommodating a piston-rod 52, while the other part functions as a shock-absorber cylinder and accommodates a shock-absorber rod 53. The piston-rod slides, in a fluid-tight manner, on the one hand within the cylinder 51 and, on the other, around a sleeve 54 integral with an inner wall 55 of the two-part cylinder 51. At its end located externally of the cylinder 51, the piston-rod 52 has a fixing element 56 which can be secured either to the aircraft structure or to the structure of the landing gear, and at its end within the cylinder 51 it has a piston-head 57 which slides in a fluid-tight manner within the cylinder 51. The piston-rod 52 contains a first lifting chamber 58 which can be supplied with pressurized hydraulic fluid by way of an orifice 59, when the lifting signal is given.

Also, the piston-rod 52 defines, with the cylinder 51 and the piston-head 57, a descent chamber 60 to which pressurized hydraulic fluid can be admitted through the orifice 61 when the descent order is given, whereas a chamber 62, defined by the piston-head 57 and the wall 55, is vented to atmosphere.

The shock-absorber rod 53 has, at that end located externally of the cylinder 51, a fixing element 63 which can be secured either to the aircraft or to the landing gear, and at its end within the cylinder 51 the rod 53 accommodates valves 64 having throttling orifices, the rod 53 also having a base 65 at this end. A separator piston 66 is mounted to slide in a fluid-tight manner within the shock-absorber rod 53 and it separates a gas chamber 67, which can be brought to and kept under pressure by a valve 68, from a hydraulic fluid chamber 69, which, by way of the valves 64, communicates with a hydraulic fluid reserve 70. The penetration of the shock-absorber rod 53 into the cylinder 51 is limited by an annular stay 71, which is mounted to slide in a fluid-tight manner in the cylinder 51 and on which the base 65 bears and which itself bears against the wall 55.

The annular stay 71 has, on its inner face, two shoulders forming stops for limiting displacement of a lifting piston 72, mounted to slide in a fluid-tight manner in the annular stay 71. The cylinder 51, the wall 55, the annular stay 71 and the lifting piston 72 define a second lifting chamber 73 connected to the first lifting chamber 58 by a duct 74, extending through a sleeve 75 which is solidly connected to the lifting piston 72 and is mounted to slide in a fluid-tight manner within the sleeve 54 which has a fluid-tight stop 76 which limits displacement of the sleeve 75. An annular space 77 defined by the lifting piston 72, the annular stay 71 and the base 65, communicates with the chamber 62, vented to atmosphere, by way of a second duct 78 which extends through the sleeve 75 and terminates at a position short of the fluid-tight stop 76.

Finally, at the end located externally of the cylinder 51 of the chamber 58, there is provided a mechanical locking device 79 including claws. The device 79 is similar to that described with reference to the embodiment of FIG. 1 and thus it is not necessary to describe it in detail again. It will simply be recalled that the resilient claws are are solidly connected to the piston-rod 52 and arranged to engage behind a projection provided on the sleeve 54, solidly connected to the cylinder 51, the claws being locked by an annular cap which, from a first position, wherein it locks the piston-rod 52 in the retracted position in the cylinder 51 (corresponding to locking in the "landing gear down" position), can slide under the action of one of two control pressures into a second position in which it releases the claws. Hydraulic release can thus be controlled by either of two pressures, namely a pressure for raising the landing gear and applied by way of the orifice 59, and a pressure for obtaining the dropped position and applied by way of the orifice 80. From the position in which the landing gear is down and the shock-absorber relieved of load, as represented in FIG. 2, and after the shock-absorbe has been put under static load, the shock-absorber alone then occupying its FIG. 4 position, it suffices, for the purpose of moving into the dropped position of the landing gear, to admit pressurized hydraulic fluid through the orifice 80. This has the effect of releasing the claws of the device 79 which permits the piston-rod 52 to emerge under the force of the weight of the aircraft until the piston-head 57 is located at a fluid-toght stop 81 on the sleeve 54, sliding of the piston-rod 57 resulting in almost all of the descent chamber 60 being voided (see FIG. 4).

After lift-off, to move from the dropped position to the "landing gear retracted" position, it suffices to admit pressurized hydraulic fluid into the first lifting chamber 58 by way of the orifice 59, and, thereby into the second lifting chamber 73, by way of the duct 74, this causing sliding of the lifting piston 72, which moves the annular stay 71 in the cylinder 1, until the shock-absorber comes under load (see FIG. 3).

If it is required to obtain the "landing gear retracted" position directly from the "landing gear down" position, it likewise suffices to admit hydraulic fluid through the orifice 59, this bringing the first and second lifting chambers 58 and 73 under pressure, thereby causing sliding of the lifting piston 72 which applies load to the shock-absorber until the end of the sleeve 75 comes to bear against the fluid-tight stop 76, the pressurizing of the lifting chamber 58 and 73 also causing the poston-rod 52 to emerge since the claws of the device 79 are released (see FIG. 3), this causing the descent chamber 60 to be exhausted.

To move from the "landing gear retracted" position or the dropped position to the "landing gear down" position, it suffices to admit pressurized hydraulic fluid to the descent chamber 60 through the supply orifice 61, and this, by acting on the piston-head 57, causes the piston-rod 52 to re-enter the cylinder 51 until the claws become locked on the corresponding projection on the sleeve 54, the annular locking cap then being returned to the locking position.

The return of the lifting piston 72 to its position results from relaxation of the shock-absorber when the hydraulic fluid from the lifting chambers 73 and 58 returns to the external circuit through the orifice 59, a pressure-holding valve, provided at the outlet of this orifice 59, being opened by application of the pressure for causing the landing gear to be lowered.

As in the embodiment of FIG. 1, the oscillations of the shock-absorber rod 53 when under load are not transmitted to the lifting piston 72 since the piston 72 is mounted to slide in the annular stay 71, consequently, no hydraulic pumping occurs in the hydraulic system of the aircraft.

The choice of an effective cross-section of the lifting piston 72 that is substantially equal to the effective cross-section of the shock-absorber likewise permits a load on the shock-absorber in the "landing gear retracted" position that is substantially equal to the pressure in the shock-absorber under static load.

In this example too, the shock-absorber functions as a means for storing the extra volume of hydraulic fluid in the circuit that results from thermal expansion, and so prevents dangerous mechanical stresses from affecting the equipment.

It is also possible, in the "landing gear down" arrangement, to replace the claw locking device 79 by any other suitable mechanical or hydraulic locking means, for example a valve for maintaining the descent chamber 60 under pressure. Such hydraulic locking could also be used in addition to the mechanical device described.

If the locking device or devices is or are provided with a "mechanical fuse", for example claws having a cross-section that ruptures above a certain force, or a "hydraulic fuse," for example an excess-pressure valve, the shock-absorber can function as an extended-stroke shock absorber in the event of a crash landing.

It will be appreciated that it would be possible to replace the shock-absorber described in the above example with any suitable shock-absorber, comprising for example, two gas chambers and two separator pistons, valves having throttling orifice of a cross-section variable in dependence upon the depth of penetration of the shock-absorber or the direction of movement of the fluid, stroke-limiting braking means, and another stop-short spring.

Finally, asymmetical dropping of the aircraft is obtainable when at least two landing gear units are equipped with such shock-absorbers of the piston-and-cylinder type.

Figure 7:
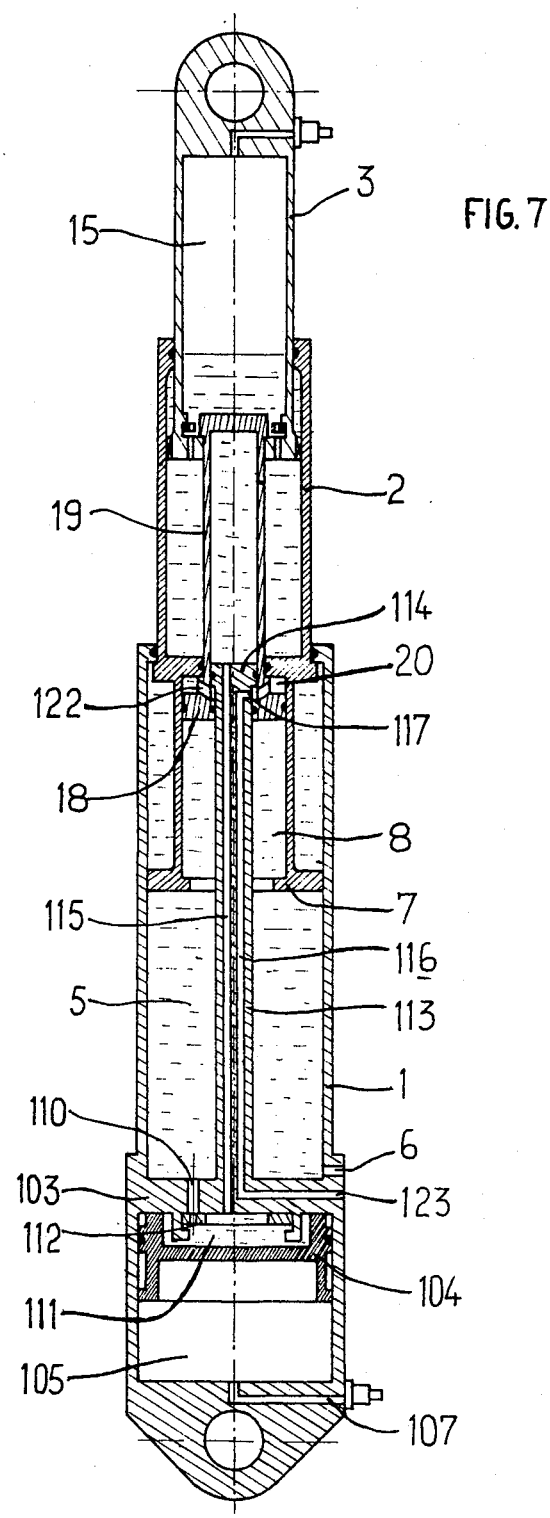

FIGS. 5 to 7 illustrate further embodiments of shock-absorbers of the invention which are designed to absorb the increase in volume of the hydraulic fluid due to thermal expansion. The shock-absorbers shown in FIGS. 5 to 7 function in compression under load and are equipped with purely hydraulic locking devices but it will be understood that the invention covers shock-absorbers which function under tensile force when load is applied and/or which are equipped with mechanical locking devices. In FIGS. 5 to 7, elements carry the same reference numerals as their equivalents in FIG. 1.

Referring first to FIG. 5, a shock-absorber comprises a cylinder 1, a piston-rod 2, to slide in a fluid-tight manner in the cylinder 1, and a shock-absorber rod 3. At its base the cylinder 1 has a fitting 4 for securing it to the member carrying the wheel or wheels of the landing gear and it defines a descent chamber 5 for the landing gear, which chamber 5 can be supplied with hydraulic fluid derived from a source of hydraulic fluid (not illustrated) by way of the supply orifice 6. The piston-rod 2 has at its base a piston-head 7 which slides in a fluid-tight manner in the cylinder 1 and the piston 2 also comprises two interior chambers 8 and 9, the shock-absorber rod 3 being slidable in a fluid-tight manner in the chamber 9.

The shock-absorber rod 3, provided with a fitting 11 for securing it to the structure of the landing gear or optionally to the aircraft structure, comprises a chamber 15 containing a pressurized gas, for example air or nitrogen, introduced by a filling and inflating valve 16. Disposed at the lower portion of the chamber 15 is at least one valve 17 provided with one or more throttling orifices. The chamber 9 and the lower portion of the chamber 15 contain a hydraulic fluid in which the valves 17 are immersed, the assembly thus formed, by the shock-absoring rod 3 and that portion of the piston-rod 2 that surrounds the chamber 9, constituting an oleopneumatic shock-absorber of the simplest kind which has no separator piston and wherein, whether in compression or relaxed, the hydraulic fluid is throttled between the chamber 9 and the chamber 15.

A piston 18 for raising the landing gear and retracting the shock-absorber and mounted to slide in a fluid-tight manner with the chamber 8, is solidly connected to a rod 19 which extends in a fluid-tight manner through the wall 10 of the piston-rod 2 separating the chamber 9 from the chamber 8. The rod 19 slides within the chamber 15 and at its upper end has a stop 21 whereby it is retained. That portion of the chamber 8, located beneath the piston 18 for lifting the shock-absorber, comminicates with the chamber 5 through an opening 100 formed in the piston-head 7. That portion of the chamber 8 located above the lifting piston 18 forms a chamber 20 for raising the landing gear and retracting the shock-absorber, which latter portion of the chamber 8 can be supplied with hydraulic fluid derived from a hydraulic fluid source (not illustrated) by way of a port 22 formed in the rod 2, a port 23 formed in the cylinder 1, and a controlled-opening hydraulic locking valve (not illustrated) of known kind, which valve does not form part of the subject-matter of the invention.

This valve achieves the hydraulic locking of the chamber 20 for raising the landing gear and retracting the shock-absorber, and of the chamber 101, forming a second lifting chamber. Similarly, a controlled-opening hydraulic locking valve (not illustrated) is provided at the opening 6 for hydraulically locking the descent chamber 5.

Provided at the lower part of the cylinder 1 is an annular stop 103, against which a separator piston 104, which is slidable in a fluid-tight manner in an additional chamber 105 is pressed by resilient means such as a spring 106. The chamber 105 is filled with hydraulic fluid and communicates, by way of an orifice 107, with an expansion valve (not illustrated) of any known suitable kind, for example, a non-return valve which, as required, permits varying amounts of fluid to be discharged from the chamber 105 and fluid to be resupplied to this chamber by the application of a pressure for lowering the landing gear.

Finally, the descent chamber 5 is connected, by way of an orifice 108, with an excess pressure valve (not illustrated) as normally employed with shock-absorbers and perforing the function of an "anti-crash" valve.

The shock-absorber of FIG. 5 functions in the following manner: starting from the "landing gear down" position, as illustrated in FIG. 1, and after the shock-absorber is put under static charge, it suffices, for the purpose of moving into the dropped position of the aircraft, to cause the chamber 5 to be voided by way of orifice 6. This hydraulic release then permits the piston-rod 2 to slide in the cylinder 1 under the effect of the weight of the aircraft until the piston head 7 moves into contact with the annular stop 103 on the cylinder 1.

From this dropped position and after take-off, to obtain the "landing gear retracted" position, it suffices to admit pressurized hydraulic fluid, by way of the orifices 23 and 22, into the lifting chamber 20, and this causes the piston 18 for lifting the shock-absorber to slide in the chamber 8, the upper stop 21 of the rod 19 causing retraction of the shock-absorber rod 3 in the chamber 9.

If it is required to obtain the "landing gear retracted" position directly from the "landing gear down" position, it likewise suffices to admit hydraulic fluid, by way of the orifices 23 and 22, and to cause the chamber 5 to be voided, this simultaneously causing sliding of the lifting piston 18, as just explained, and sliding of the piston-rod 2 in the cylinder 1 until it bears against the stop 103.

To move from the "landing gear retracted" position or the dropped position to the "landing gear down" position, it suffices to admit hydraulic fluid under pressure into the descent chamber 5 by way of the supply orifice 6 and, at the same time, to cause voiding by way of the orifices 22 and 23, which, by acting on the piston-head 7 and on the piston 18 for lifting the shock-absorber, results in sliding of the piston-rod 2 until it is in abutment with the upper portion of the cylinder 1, and return to the relaxed position of the shock-absorber or to the position in which it is under static load, When the shock-absorber is loaded, for example when the aircraft is taxiing, the shock-absorber rod 3 oscillates in the chamber 9. The advantage provided by the rod 19 is identical to that obtained with the rod 19 of FIG. 1.

In this equipment it is again possible to select an effective cross-section of the lifting piston 18 that is substantially equal to that of the shock-absorber, and this permits hydraulic retraction of the shock-absorber by the action of a balancing force thereon, with the advantages which stem therefrom and are identical to those associated with the equipment of FIG. 1.

The operations of hydraulically locking the equipment in the "landing gear retracted" position and in the "landing gear down" position are accompanied by trapping of a volume of hydraulic fluid, the expansion of which, caused by the considerable differences in temperature to which the aircraft may be subjected during its displacement, acts, on the one hand, against the shock-absorber, which functions as an expansion store for itself and for the fluid locked in the lifting chambers and, on the other hand, against the separator piston 104 which is displaced against the action of the spring 106, so as partially to void, depending upon requirements, the chamber 105 which performs the function of compensating for the additional volume of hydraulic fluid created by thermal expansion of the fluid contained in the chambers 8 and 5.

Displacement of the separator piston 104 against the action of the spring 106 is limited by a stop 109 so that the space swept by the piston 104 corresponds to the maximum increase in the volume of the hydraulic fluid, the storage chamber 105 for which absorbs the extra volume resulting from expansion, and the collapse of the piston-and-cylinder system is limited in the event of leakage of hydraulic fluid, for example, at the expansion valve.

If the aircraft should land at a vertical speed that is too great for the shock-absorber itself to be able to absorb the corresponding energy, the excess-pressure valve with which the descent cahmber 5 communicates by way of the orifice 108, opens, and the piston-head 7 is able to expel hydraulic fluid from the cylinder 1 over its entire stroke. Thus, in the event of a crash landing, the piston-and-cylinder system enables the shock-absorber to extend its stroke and to absorb additional energy on impact.

FIG. 6 illustrates the lower portion of a modified construction of shock-absorber of the piston-and-cylinder type, which in other respects is identical to that described with reference to FIG. 5. In this modifed construction, the chamber 105 contains a gas under pressure, for example, air or nitrogen, introduced by an inflating valve at an orifice 107. The pressurized gas constitutes both a pneumatic spring, which presses the separator piston 104 against the stop 103, and an additional shock-absorbing chamber, the effects of which supplement those of the main oleopneumatic shock-absorber contained in the upper portion of the equipment.

Thus, a special shock-absorber is provided having at least two gas chambers separated by a piston-and-cylinder system, the cylinder of which accommodates one of the gas chambers.

This apparatus permits the storage of the extra volume of hydraulic fluid resulting from thermal expansion, and it also increases the shock-absorbing stroke, enabling energy, additional to that dissipated by the main shock-absorber, to be absorbed when the loads exceed the level that the latter is able to deal with.

Since the additional shock-absorbing chamber 105 is loaded from the moment at which the load on the main shock-absorber exceeds the inflation pressure of the chamber 105, the latter provides an effect which limits the forces borne by the main shock-absorber. Finally, in the case of forces exceeding those that the assembly, comprising the main shock-absorber and the additional shock-absorbing chamber, are able to support, an overload valve (not illustrated), communicating through the orifice 108 with the chamber 5, opens and, as previously explained, the piston-and-cylinder system enables the stroke of the shock-absorber to be extended, an additional fraction of energy being absorbed on impact and the hydraulic fluid being expelled from the cylinder 1.

In the embodiment illustrated in FIG. 7, a pressurized gas introduced into the chamber 105 by an inflating valve at an orifice 107, presses the separator piston 104 against a stop 103 which takes the form of a transverse wall within the cylinder 1. Formed in this wall is at least one orifice 110 whereby the descent chamber 5 communicates with a hydraulic fluid chamber 111 formed between the piston 104 and the wall 103. Fitted at the outlet of the or each orifice 110 in the chamber 111 is a valve 112 which has a throttling orifice and which, together with the chamber 5, 111 and 105 and the piston 104, constitute an oleopneumatic shock-absorber for the displacements of the piston-rod 2, carrying the main shock-absorber, in the cylinder 1.

A sleeve 113, solidly connected to the wall 103 and therefore with the cylinder 1, extends through the chambers 5 and 8 and through the central portion of the piston 18 for lifting and for retracting the shock-absorber, the piston 18 and the sleeve 113 sliding one within the other in a fluid-tight manner. The sleeve 113 has an elarged head 114 which is mounted to slide in a fluid-tight manner within the hollow rod 19 solidly connected to the lifting piston 18. Extending through the sleeve 113 are two ducts 115 and 116, the first 115 of which connects the interior of the hollow rod 19 to the chamber 111, which are both filled with hydraulic fluid, and the second 116 of which, has a radial portion which terminates short of the enlarged head 114 but beyond the lifting piston 18 by way of an orifice 117 which, by way of bores 122 formed in that portion of the hollow rod 19 that is immediately adjacent the piston 18, communicates with the lifting chamber. At the other of its ends the duct 116 has a radially extending portion 123, coupled to an external hydraulic circuit whereby the single lifting chamber 20 can be supplied with or voided or hydraulic fluid, whereas in the case of the descent chamber 5 this occurs by way of the orifice 6.

In the embodiment of FIG. 7, there is no seal between the piston 7 and the cylinder 1 in which the piston 7 slides. The shock-absorber functions like those previously described and provides the same advantages but in comparison it has greater volumes wherein additional shock-absorption can take place, because of the formation of the means for storing the additional volume of fluid caused by expansion in a shock-absorber in which displacement of the piston-rod 2 in the cylinder 1 is improved; consequently it becomes possible to dispense with an "anti-crash" valve, the function of which is performed, in a non-destructive manner, by this additional shock-absorber. This, the pilot of an aircraft, the landing gear of which is equipped with such shock-absorbers of the piston-and-cylinder type, is able to select either of two ranges of vertical landing speed. In the case of low landing speeds and therefore when low energy is to be absorbed, only the main shock-absorber will be loaded, whereas for high vertical speeds the two shock-absorbers are loaded, and this, on the other hand, will introduce a limitation to the angle at which the aircraft is set down on impact, because of the reduced ground coverage obtained at this moment. Furthermore, this last arrangement operates with a lifting chamber 20 of reduced cubic capacity and the annular chamber defined by the rod 2 and the cylinder 1 is not subjected to pressure-losses when the dropped position is assumed. Thus, no hydraulic pumping occurs during operation of the apparatus.

Finally, it should be pointed out that the embodiments illustrated in FIGS. 5 to 7 have no chamber communicating with the atmosphere, that the shock-absorbing function is carried out with a single moving joint, and that the structure as a whole is very simple.

It will be further understood that if a separator piston is provided in a suitable manner in the chamber 15, for the purpose of separating the pressurized gas from the hydraulic fluid, it is possible to reverse the shock-absorbers when in use by connecting the fixing element 11 to the element carrying the wheel or wheels, and by connecting the fixing element 4 to the structure of the landing gear or to the aircraft structure.

In the case where at least two landing gears of the aircraft are equipped with such shock-absorbers of the piston-and-cylinder type, a hydraulic control for selecting only one or less than all of them enables the aircraft to be dropped asymmetrically.

What is claimed is:

1. A shock-absorber of the piston-and-cylinder kind for use in the landing gear of an aircraft and comprising a cylinder, a piston-rod and a shock-absorbing rod which encloses a chamber for compressed gas and is provided with a valve having a throttling orifice, said shock-absorbing rod is mounted to slide, in a fluid-tight manner in a first chamber filled with hydraulic fluid in either said cylinder or said piston-rod, to form a oleopneumatic shock-absorber; said piston-rod is mounted to slide, in a fluid-tight manner in said cylinder and is solidly connected to a piston-head which, with said cylinder, defines a descent chamber to control lowering of the landing gear when hydraulic fluid is admitted to said descent chamber, said shock-absorber also comprises a lifting piston to load said shock-absorber and mounted to slide within a second chamber in either said cylinder or said piston-rod, so defining a lifting chamber to control lifting of the landing gear when hydraulic fluid is admitted to the lifting chamber through a hydraulic locking valve having a pressure-controlled opening and a locking device for locking said piston-rod in relation to said cylinder, in the "landing gear down" position, said locking device being releasable in two ways, firstly by the application of the lifting pressure to the landing gear, which simultaneously pressurizes said lifting chamber, by displacement of said lifting piston which loads said shock-absorber, and voids said descent chamber by displacement of said piston-rod in said cylinder, and secondly by the application of a simple pressure for releasing said locking device, thus permitting said piston-rod to be displaced in said cylinder under the action of the weight of the aircraft which thus moves the landing gear into a dropped position when said descent chamber is voided, the movement from the dropped position or the "landing gear retracted" position to the "landing gear down" position being effectable solely by applying a descent pressure simultaneously in said descent chamber and at said locking valve, so as to open said locking valve.

2. A shock-absorber as claimed in claim 1, wherein said oleopneumatic shock-absorber functions in compression under the load because said first and said second chambers are formed in said piston-rod, the displacement of said lifting piston, under the action of the lifting pressure, loading said shock-absorber by way of a rod held in abutting relationship against said shock-absorber rod.

3. A shock-absorber as claimed in claim 2, wherein said rod carries a stop which is displaced in an inner chamber which is vented to atmosphere and is formed within said shock-absorber rod, such displacement occurring when said shock-absorber rod is subjected to oscillations under load, so as to prevent the oscillations from being transmitted to said lifting piston.

4. A shock-absorber as claimed in claim 3, wherein a passage formed in said rod and in said lifting piston vents said second chamber to atmosphere so that said shock-absorber acts as a means for storing the additional volume of hydraulic fluid created when the said hydraulic fluid expands.

5. A shock-absorber as claimed in claim 1, wherein said oleopneumatic shock-absorber functions under tensile force when load is applied due to said first and second chambers being formed in said cylinder, said displacement of said lifting piston, under the action of the lifting pressure, loading said shock-absorber by way of a stay which holds said lifting piston in abutment and, with said shock-absorber rod and said lifting piston, defines a chamber vented to atmosphere.

6. A shock-absorber as claimed in claim 5, wherein said lifting piston is mounted to slide on said stay which in turn slides in said second chamber.

7. A shock-absorber as claimed in claim 1, wherein said locking device is a mechanical device including claws to engage behind a projection of said piston-rod, and a slide for locking the claws.

8. A shock-absorber as claimed in claim 1, wherein said locking device is a hydraulic device and includes a hydraulic locking valve for said descent chamber.

9. A shock-absorber as claimed in claim 1, wherein said locking device comprises elements adapted to release said piston-rod when said piston-rod is subjected to a force greater than a predetermined value, so that said shock-absorber functions as a shock-absorber having an extended stroke in the event of crash-landing.

10. A shock-absorber as claimed in claim 1, wherein the effective surface of said lifting piston is substantially equal to that of said shock-absorber, thereby permitting a hydraulic load on said shock-absorber in the "landing gear retracted" position that is substantially equal to the pressure in said shock-absorber under static load.

11. A shock-absorber as claimed in claim 1, including a compensating storage chamber adjacent said desent chamber from which it is separated by a separator piston which is biased by spring means against a first stop so as to limit the volume of said descent chamber, said separator piston being displaceable against the action of said spring means under the effect of thermal expansion of the hydraulic fluid in said descent chamber, so that said compensating storage chamber compensates for the extra volume of hydraulic fluid resulting from thermal expansion.

12. A shock-absorber as claimed in claim 11, wherein that portion of said second chamber that is not occupied by said lifting chamber communicates with said descent chamber so that said storage chamber can store the increased volume of hydraulic fluid from said lifting chamber resulting from thermal expansion of the fluid.

13. A shock-absorber as claimed in claim 11, wherein said storage chamber for storing the additional volume of fluid resulting from thermal expansion is filled with hydraulic fluid and said spring means presses said separator piston against said stop, said storage chamber communicating with an expansion valve which, as required, permits voiding of said storage chamber when said separator piston is displaced against the action of said spring by expansion of the hydraulic fluid, and also permitting said storage chamber to be resupplied when a descent pressure is applied in said descent chamber.

14. A shock-absorber as claimed in claim 11, wherein said spring means comprises a pressurized gas in said storage chamber forming a pneumatic spring which pressed said separator piston against said first stop, said pressurized gas also forming an additional shock-absorbing chamber, the action of which supplements that of said oleopneumatic shock-absorber.

15. A shock-absorber as claimed in claim 11, wherein said displacement of said separator piston into said compensating storage chamber against the action of said spring means is limited by a second stop to correspond to the maximum increase in the volume of the hydraulic fluid, and to limit the collapse of said piston-and-cylinder system in the event of destruction of said spring means or of leakage of the hydraulic fluid contained in said storage chamber.

16. A shock-absorber as claimed in claim 11, and having a purely hydraulic locking system, in which said descent chamber is connect to an excess-pressure valve which causes said descent chamber to be voided when said piston-rod is subjected to a force above a predetermined value, so that said shock-absorber functions as a shock-absorber having an extended stroke in the event of a crash landing.

17. A shock-absorber as claimed in claim 11, wherein said first stop comprises a wall disposed within said cylinder and having formed therein at least one axial orifice terminating at a throttling valve, positioned between said wall and said separator piston, so as to constitute a second shock-absorber.

18. A shock-absorber as claimed in claim 17, functioning in compression, wherein said lifting chamber is supplied through a duct formed within a sleeve which is solidly connected to said cylinder, slides in a fluid-tight manner in said lifting piston and is provided with an enlarged head which slides in a fluid-tight manner within a rod solidly connected to said lifting piston and held in abutment in the shock-absorber, when the landing gear is down and said shock-absorber is relieved of load.

* * * * *